US010142884B2

(12) United States Patent
Chauhan et al.

(10) Patent No.: US 10,142,884 B2
(45) Date of Patent: Nov. 27, 2018

(54) SYSTEM AND METHOD FOR PROCESSING OF DATA IN A WIRELESS COMMUNICATION SYSTEM

(71) Applicant: Samsung Electronics Co., Ltd, Gyeonggi-do (KR)

(72) Inventors: Ankur Chauhan, Bangalore (IN); Vadlapudi Tirumala SreeHariVara Prasad, Bangalore (IN); Ranjeet Kumar Patro, Bangalore (IN); Anshuman Nigam, Bangalore (IN); Anil Agiwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 15/120,737

(22) PCT Filed: Feb. 23, 2015

(86) PCT No.: PCT/KR2015/001709
§ 371 (c)(1),
(2) Date: Aug. 22, 2016

(87) PCT Pub. No.: WO2015/126200
PCT Pub. Date: Aug. 27, 2015

(65) Prior Publication Data
US 2017/0280353 A1   Sep. 28, 2017

(30) Foreign Application Priority Data

Feb. 21, 2014  (IN) .............................. 883/CHE/2014
Nov. 4, 2014   (IN) .............................. 883/CHE/2014

(51) Int. Cl.
*H04W 28/06*       (2009.01)
*H04L 29/06*       (2006.01)
(Continued)

(52) U.S. Cl.
CPC ........... *H04W 28/065* (2013.01); *H04L 69/12* (2013.01); *H04W 28/06* (2013.01); *H04L 1/16* (2013.01);
(Continued)

(58) Field of Classification Search
CPC ....................................................... H04L 1/00
See application file for complete search history.

(56) References Cited

U.S. PATENT DOCUMENTS 7,471,676 B2   12/2008 Wybenga et al.
7,715,428 B2    5/2010 Basso et al.
(Continued)

FOREIGN PATENT DOCUMENTS

WO   WO 2006/031459 A1   3/2006

OTHER PUBLICATIONS

International Search Report dated May 4, 2015 in connection with International Application No. PCT/KR2015/001709, 6 pages.
(Continued)

*Primary Examiner* — Zhiren Qin (57) ABSTRACT

The present disclosure relates to a pre-5th-Generation (5G) or 5G communication system to be provided for supporting higher data rates Beyond 4th-Generation (4G) communication system such as Long Term Evolution (LTE). The method for achieving very high data rates in wireless communication systems is provided. The method comprises receiving protocol data units (PDUs) by receiving units, providing the received PDUs to processing units, processing the received PDUs by the processing units for extracting service data units (SDUs), providing the extracted SDUs to a sorting unit, processing the received SDUs by the sorting unit to derive one or more lists of sequentially contiguous SDUs, providing the derived lists of sequentially contiguous SDUs to a window processing unit, and processing the derived list of sequentially contiguous SDUs by the window processing unit for sending the in-sequence SDUs to a delivery unit.

18 Claims, 5 Drawing Sheets

(51) Int. Cl.
*H04L 1/16* (2006.01)
*H04W 80/02* (2009.01)
*H04W 28/02* (2009.01)
*H04W 72/04* (2009.01)

(52) U.S. Cl.
CPC ............ *H04W 28/02* (2013.01); *H04W 72/04* (2013.01); *H04W 80/02* (2013.01)

(56) References Cited

U.S. PATENT DOCUMENTS

| | | |
|---|---|---|
| 2005/0186958 A1 | 8/2005 | Hansen et al. |
| 2006/0156165 A1* | 7/2006 | Kim ...................... H04L 1/1848 714/749 |
| 2008/0165713 A1 | 7/2008 | Nishibayashi et al. |
| 2008/0232490 A1 | 9/2008 | Gross et al. |
| 2009/0252134 A1* | 10/2009 | Schlicht ................ H04L 1/0015 370/338 |
| 2009/0318127 A1* | 12/2009 | Yi .......................... H04L 1/1829 455/422.1 |
| 2010/0039996 A1* | 2/2010 | Ohta ....................... H04L 47/10 370/328 |
| 2011/0268031 A1* | 11/2011 | Agiwal ................ H04W 28/065 370/328 |
| 2012/0236789 A1 | 9/2012 | Dravida et al. |
| 2012/0294281 A1 | 11/2012 | Park |

OTHER PUBLICATIONS

Written Opinion of the International Searching Authority dated May 4, 2015 in connection with International Application No. PCT/KR2015/001709, 5 pages.

* cited by examiner

Valid Combinations :
General Header + Connection Header(s) + Data
General Header + Extended Header(s)
General Header + Connection Header(s) + Extended Header(s) +Data

Legend:
RNTI = Flow ID
FN = Frame Number
FI = Frame Indicator
FSN = Frame Sequence Number
SOF = Start of Fragment
MOF = Middle of Fragment
EOF = End of Fragment
SDU = Service Data Unit
PDU = Protocol Data Unit

SYSTEM AND METHOD FOR PROCESSING OF DATA IN A WIRELESS COMMUNICATION SYSTEM

CROSS REFERENCE TO RELATED APPLICATIONS

This application is a National Phase Entry of PCT International Application No. PCT/KR2015/001709, which was filed on Feb. 23, 2015, and claims a priority to Indian Patent Application No. 883/CHE/2014, which was filed on Feb. 21, 2014, and claims a priority to Indian Patent Application No. 883/CHE/2014, which was filed on Nov. 4, 2014, the contents of which are incorporated herein by reference.

TECHNICAL FIELD

The present invention relates to system and method for parallel processing of data in a wireless communication system.

BACKGROUND ART

To meet the demand for wireless data traffic having increased since deployment of 4G (4$^{th}$-Generation) communication systems, efforts have been made to develop an improved 5G (5$^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the recent years several broadband wireless technologies have been developed to meet the growing number of broadband subscribers and to provide more and better applications and services. The 3rd Generation Partnership Project 2 (3GPP2) developed Code Division Multiple Access 2000 (CDMA 2000), 1× Evolution Data Optimized (1× EVDO) and Ultra Mobile Broadband (UMB) systems. The 3rd Generation Partnership Project (3GPP) developed Wideband Code Division Multiple Access (WCDMA), High Speed Packet Access (HSPA) and Long Term Evolution (LTE) systems. The Institute of Electrical and Electronics Engineers developed Mobile Worldwide Interoperability for Microwave Access (WiMAX) systems. As more and more people become users of mobile communication systems and more and more services are provided over these systems, there is an increasing need for an advanced wireless communication system with large capacity, high throughput and lower latency.

One of the key goals for the advanced wireless communication system is to support peak data rate of the order of 50 Giga bits per second (Gbps) and an average user throughput of the order of 1 Gbps. The implementation of latest wireless communication technologies like LTE, Advanced WiMAX in the mobile handsets currently supports protocol stack medium access (MAC) layer throughput up to 100 mega bits per second(Mbps). Supporting very high data rate of the order of Gbps is a challenge in the mobile handsets. The tremendous increase in throughput from 100 Mbps to 50 Gbps impacts one or more of the following parameters:

a) Number (N) of MAC Protocol Data Unit (PDUs) to be Processed: The MAC layer in protocol stack provides MAC Protocol Data Unit (PDU) to Physical layer for transmitting in one physical burst. One physical burst may carry one or more MAC PDUs. The increase in throughput will lead to increase in number of MAC PDUs to be processed in a given time. If the packet size and the transmit time interval (TTI) in which one packet is transmitted is same in current wireless communication technology and the advanced wireless communication technology then the number of MAC PDUs that needs to be processed in advanced wireless communication technology is 500 times more than the number of MAC PDUs processed in current wireless communication technology. If the transmit time interval is reduced by 10 times in advanced wireless communication technology then also 50 times more MAC PDUs needs to be processed in 1/10 of the time in advanced wireless communication technology.

The only way to keep the number of MAC PDUs to be processed in advanced wireless communication technology same as the number of MAC PDUs processed in current wireless communication technology is to increase the packet size by 500 times which is practically not possible. The table 1 below lists various combinations of TTIs, packet sizes and number of MAC PDUs required to be processed in advanced wireless communication technology.

The table 1 is Number of MAC PDUs to be processed in advanced wireless communication technology.

TABLE 1

| N | TTI$_{Advanced}$ | TTI$_{Current}$ | Packet Size$_{Advanced}$ | Packet Size$_{Current}$ |
|---|---|---|---|---|
| 500x | 1 ms | 1 ms | 12500 bytes | 10 mb/1 s = 12500 bytes phy burst per 1 ms TTI |
| 50x | 0.1 ms | 1 ms | 12500 bytes | 12500 bytes |
| 50x | 1 ms | 1 ms | 12500 bytes | 12500 bytes |
| 5x | 0.1 ms | 1 ms | 12500 bytes | 12500 bytes | b) Time Interval in which (N) MAC PDUs are Transmitted and Received in the Transmitter and Receiver Respectively: The transmit time interval in the advanced wireless communication technology is likely to be smaller than the current wireless communication technology. For example, if higher frequency (example mmWave frequency) spectrum is used in advanced wireless communication technology then the transmit time interval is going to be smaller because of the mmWave channel characteristics. The reduced transmit time interval will also assist in reducing the user plane latency in advanced wireless communication technology.

c) Packet Size: The packet size in the advanced wireless communication technology may be kept same or larger than the current wireless communication technology.

Based on the above illustration, it can be inferred that in the advanced wireless communication technology more number of packets, larger in size needs to be processed in shorter time.

The implementation of latest wireless communication technologies like LTE, Advanced WiMAX in the mobile handsets currently supports protocol stack medium access (MAC) layer throughput up to 100 mega bits per second (Mbps). In current systems (esp. on mobile station side), generally, one central processing unit (CPU) is used and most of the operations have to be scheduled on this CPU in a serialized manner. The CPU in the current implementation is already fully loaded for processing the supported data rates. One way to further improve the supported data rates is by increasing the CPU clock speed. However, increasing the CPU clock speed has its limitations in terms of power consumption and heat dissipation among other issues.

Figure 1:
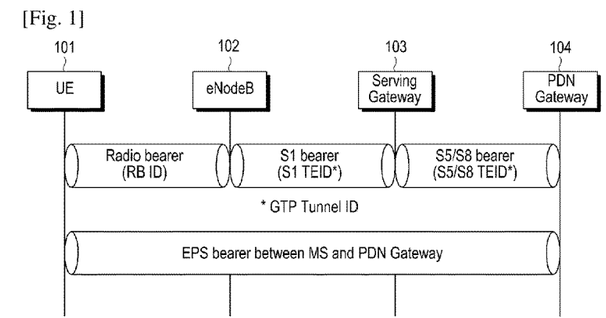
FIG. 1 illustrates a block diagram of User plane architecture in current wireless communication technology.

The user plane architecture in the current wireless communication technology (e.g. LTE) as illustrated in FIG. 1 comprises of user equipment (UE) 101, enhanced node B (eNB) or base station 102, serving gateway 103 and packet data node (PDN) gateway 104. Evolved Packet Service (EPS) bearer is established between the UE 101 and PDN gateway 104 for the transportation of application packet (or internet protocol (IP) packet). EPS bearer is a bearer corresponding to an IP packet flow with a defined QoS between the UE 101 and PDN gateway 104. EPS bearer may be bidirectional or unidirectional. Multiple bearers can be established for an UE 101 in order to provide different QoS streams or connectivity to different PDNs 104. For example, a user might be engaged in a voice (VoIP) call while at the same time performing web browsing or File Transfer Protocol (FTP) download. A VoIP bearer would provide the necessary QoS for the voice call, while a best-effort bearer would be suitable for the web browsing or FTP session. S5/S8 bearer transports the packet of an EPS bearer between the PDN gateway 104 and serving gateway 103. S1 bearer transports the packet of an EPS bearer between a serving gateway 103 and eNB 102. S-GW 103 stores a one-to-one mapping between an S1 bearer and an S5/S8 bearer. The bearer is identified by the GTP tunnel ID across both interfaces. A radio bearer (RB) transports the packets of an EPS bearer between an UE 101 & an eNodeB 102. There is one to one mapping between the EPS bearer, RB, S1 bearer and S5/S8 bearers.

Figure 2:
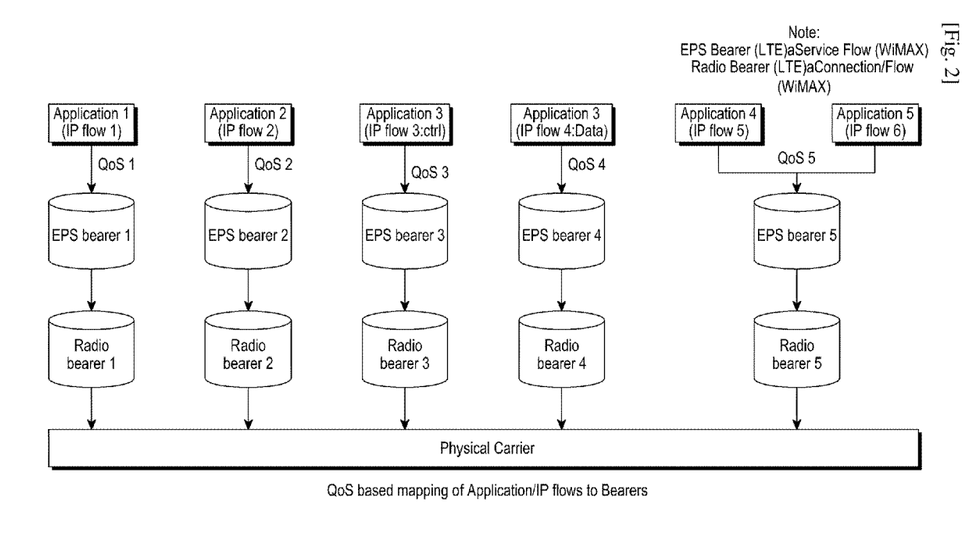
FIG. 2 illustrates a block diagram showing mapping of application or IP flows, EPS bearer/Radio bearer in the current wireless communication technology.

FIG. 2 illustrates the mapping of application or IP flows, EPS bearer/Radio bearer in the current wireless communication technology (e.g. LTE). Applications or IP flows having different QoS are mapped to different EPS bearer. For example application 1 & application 2 are mapped to EPS bearer 1 and EPS bearer 2 respectively. Applications/or IP flows are mapped to EPS bearer based on packet classification rule or transmit flow template i.e. source IP address, destination IP address and port number of IP flow. Applications having same QoS can be mapped to same EPS bearer. For example, application 4 & application 5 are mapped to same EPS bearer 5. Application having different type of packets (e.g. control, data) can be mapped to multiple EPS bearers. For example application 3 is mapped to EPS bearer 3 and EPS bearer 4. EPS bearer 3 carries control packets of application 3 whereas EPS bearer 4 carries data packets of application 3. There is one to one mapping between EPS bearer & Radio bearer. A radio bearer exists for every EPS bearer.

Figure 3:
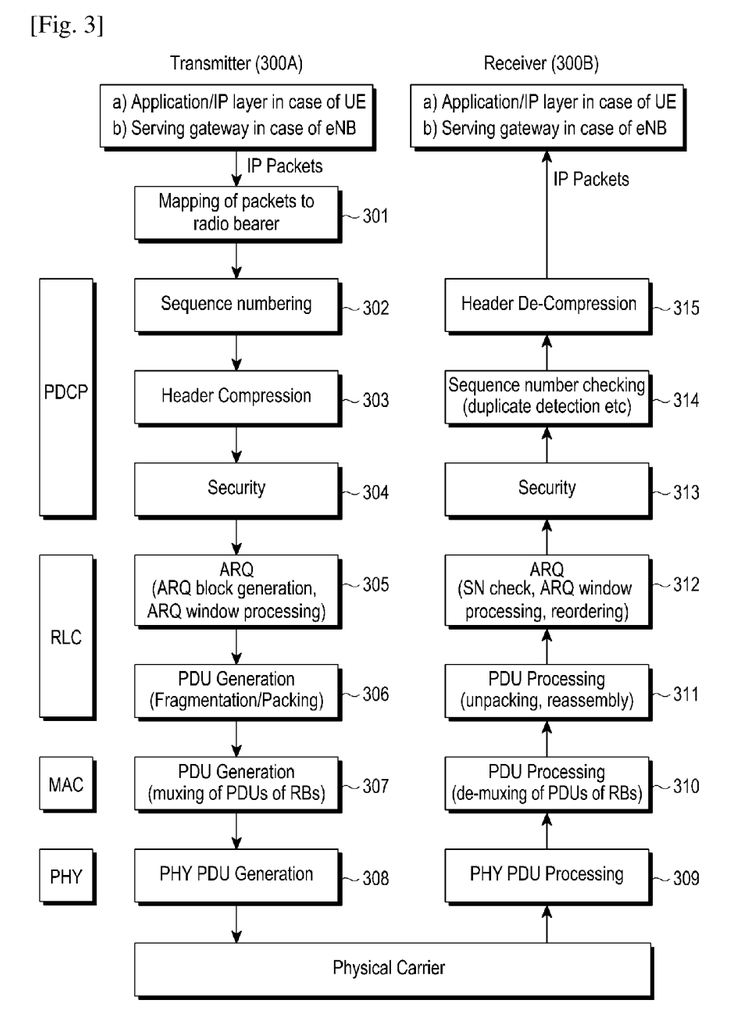
FIG. 3 illustrates a flow chart showing an exemplary process of EPS bearer packet processing in current wireless communication technology.

Each packet in the user plane is processed by functions defined by various layers. The packet processing functions through which each packet of an IP flow goes through in the transmitter and receiver is illustrated in FIG. 3.

Process performed at transmitter 300A:

At step 301, IP packets (received from an application/IP layer in case of UE and serving gateway in case of eNB) are mapped to one or more radio bearers. At step 302, the IP packets are sequenced according to a packet number. At steps 303 and 304, the header compression & security functions are performed. At step 305, ARQ process is performed which includes generation of ARQ block and process of ARQ window. Here ARQ means Automatic Repeat request which is an error-control method performed during data transmission. At step 306, RLC PDUs are generated by performing fragmentation or packing functions. At step 307, MAC PDUs are generated by performing multiplexing of RLC PDUs. At step 308, the PHY PDUs are generated from the MAC PDUs and provided to physical carrier 300C.

At the transmitter (i.e. UE in case of uplink and eNB in case of downlink), it is determined whether the IP packets received (packets are received by the eNB from the serving gateway in case of downlink and packets are received from application or IP layer in case of uplink) from the upper layer belongs to which radio bearer. Multiple radio bearer may exists between the UE and eNB to carry different IP flows.

The IP packets (also termed as PDCP service data units (SDUs)) are then mapped to appropriate PDCP unit which applies the header compression and security functions and generates the PDCP PDU. The header compression & security functions are applied by the PDCP layer in the protocol stack. The header compression and security functions are optional and are configurable at the time of radio bearer establishment. The PDCP layer also performs sequence numbering of PDCP SDUs. An instance of PDCP layer or PDCP unit processes the PDCP SDUs. Each EPS bearer is associated with one RB which in turn is associated with one PDCP unit. The generated PDCP PDU (also termed as RLC SDU) is then mapped to appropriate RLC unit which applies the ARQ, fragmentation or packing functions and generates the RLC PDUs. The RLC PDUs (also termed as MAC SDUs) from one or more RBs are then processed by MAC layer unit to generate the MAC PDUs which are then given to physical layer for transmission on physical carrier. There is only one MAC layer unit per UE whereas there is one PDCP and RLC unit per radio bearer. There is one PDCP and RLC unit per EPS bearer as there is one to one mapping between the EPS bearer and radio bearer.

Process Performed at Receiver 300B:

At step 309, the received PHY PDUs are processed to generate MAC PDUs. At step 310, the MAC PDUs are de-multiplexed to generate RLC PDUs. At step 311, the RLC PDUs are processed by performing functions of unpacking and reassembling. At step 312, ARQ function is performed on the received RLC PDUs. At step 313, Security function is performed on PDUs. At step 314, sequence number of PDUs is checked and duplicate PDUs are detected and removed. At step 315, header de-compression is performed on the sequenced PDUs.

At the receiver (i.e. UE in case of downlink and eNB in case of uplink) physical layer receives the packets from the transmitter (UE in case of uplink and eNB in case of downlink) on the physical carrier. The physical layer processes the received packets and sends the received MAC PDUs to the MAC layer. The MAC layer unit de-muxes the RLC PDUs and passes them to appropriate RLC unit. RLC unit applies header parsing, unpacking, reassembly functions and ARQ functions to generate the PDCP PDUs and passes them to appropriate PDCP unit. The PDCP unit then applies the security and header decompression functions and sends the generated packets to IP layer in case the receiver is an UE or serving gateway in case the receiver is an eNB.

One of the ways to support data rate in order of Giga bits is to use multiple processors. One of the challenges in this layered architecture of user plane packet processing is the modularization of MAC and RLC processing into smaller and parallelizable processing units (with minimal sharing of common data) such that they can be efficiently deployable on multi-core processor architectures to achieve very high data rates which are envisaged in 5G & beyond mobile communication systems.

SUMMARY

An embodiment of the present invention describes a method of parallel processing of data on a multi-core system. The method comprises receiving one or more protocol data units (PDUs) by one or more receiving units, providing the received one or more PDUs to one or more processing units, processing the received one or more PDU by the one or more processing units for extracting one or more service data units (SDUs), providing the extracted one or more SDUs to a sorting unit, processing the one or more received SDUs by the sorting unit to derive one or more lists of sequentially contiguous one or more SDUs, providing the derived one or more lists of sequentially contiguous one or more SDUs to a window processing unit, and processing the derived list of sequentially contiguous one or more SDUs by the window processing unit for sending the in-sequence one or more SDUs to a delivery unit.

In one embodiment, the method further comprises detecting one or more fragmented SDUs the one or more processing units, providing the one or more fragmented SDUs to one or more fragment processing units, processing the one or more fragmented SDUs by the one or more fragment processing units, and providing the reassembled one or more SDU to the sorting unit.

In one embodiment, the one or more processing unit select a fragment processing unit for providing of one or more fragmented SDUs based on the sequence number of each of the fragmented SDU.

In one embodiment, the processing of the one or more fragmented SDUs comprises processing a connection header to reassemble the two or more fragmented SDUs based on the sequence number of each of the fragmented SDU.

In one embodiment, the one or more Protocol Data Units (PDUs) are one or more medium access control (MAC) PDUs, and the one or more service data units (SDUs) are one or more radio link control (RLC) SDUs.

In one embodiment, the processing of the received one or more PDUs by the one or more processing units comprises processing a connection header, and an extended header of each of the one or more PDUs, arranging one or more SDUs in a prescribed order, removing one or more duplicate SDUs, deriving one or more lists of sequentially contiguous one or more SDUs, and sending the derived one or more lists of sequentially contiguous one or more SDUs to the sorting unit.

In one embodiment, the processing of the received one or more SDUs by the sorting unit comprises generating one or more lists of contiguous one or more SDUs, detecting of one or more missed SDUs and initiating error detection timer. In one embodiment, the sorting unit is scheduled to run only after the expiry of pre-defined time.

In one embodiment, the processing of the received one or more SDUs by the window processing unit comprises generating a single ordered list of one or more SDUs, updating the window status variables, detecting one or more duplicate packets and discarding out-of-window received packets.

In one embodiment, the processing of the derived list of sequentially contiguous one or more SDUs by the window processing unit comprises handling of error detection timer.

In one embodiment, the processing of the derived list of sequentially contiguous one or more SDUs by the window processing unit comprises of starting of error correction timer for the missed one or more SDUs and removing error correction timer when the missed SDU is received.

In one embodiment, the processing of the derived list of sequentially contiguous one or more SDUs by the window processing unit comprises of starting and removing sync loss timer.

Another embodiment of the present invention describes a multi-core system for parallel processing of data. The system comprises one or more receiving units for receiving one or more protocol data units (PDUs), one or more processing units connected with the one or more receiving unit for processing the one or more PDUs to extract one or more service data units (SDUs), a sorting unit connected to the one or more processing units for processing the one or more SDUs to derive one or more lists of sequentially contiguous one or more SDUs, a window processing unit connected to the sorting unit for processing the one or more derived lists of sequentially contiguous one or more SDUs for sending the in-sequence one or more SDUs to a delivery unit.

In one embodiment, the system further comprises one or more fragment processing units for processing the one or more fragmented SDUs to provide the reassembled one or more SDU to the SDU sorting unit.

BRIEF DESCRIPTION OF THE DRAWINGS

The aforementioned aspects and other features of the present invention will be explained in the following description, taken in conjunction with the accompanying drawings, wherein.

DETAILED DESCRIPTION

The embodiments of the present invention will now be described in detail with reference to the accompanying drawings. However, the present invention is not limited to the embodiments. The present invention can be modified in various forms. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the conventional wireless systems, such as 4G systems, a single core/process is responsible for executing all of the tasks sequentially. In the next generation cellular systems (i.e. 5G system), RLC/MAC unit is required to process hundred orders of magnitude more MAC PDUs than the existing 4G systems and a single core based system/architecture cannot meet the expected data rate requirements of the 5G systems. In order to obtain a high speed data rate such as 50 Gbps, the present invention provides a multi-core based system/architecture that divides all the tasks/functionalities (as discussed below) among multiple cores (with minimum data sharing between cores) and allows faster processing of packets to achieve the data rate requirements of 5G systems.

Figure 4:
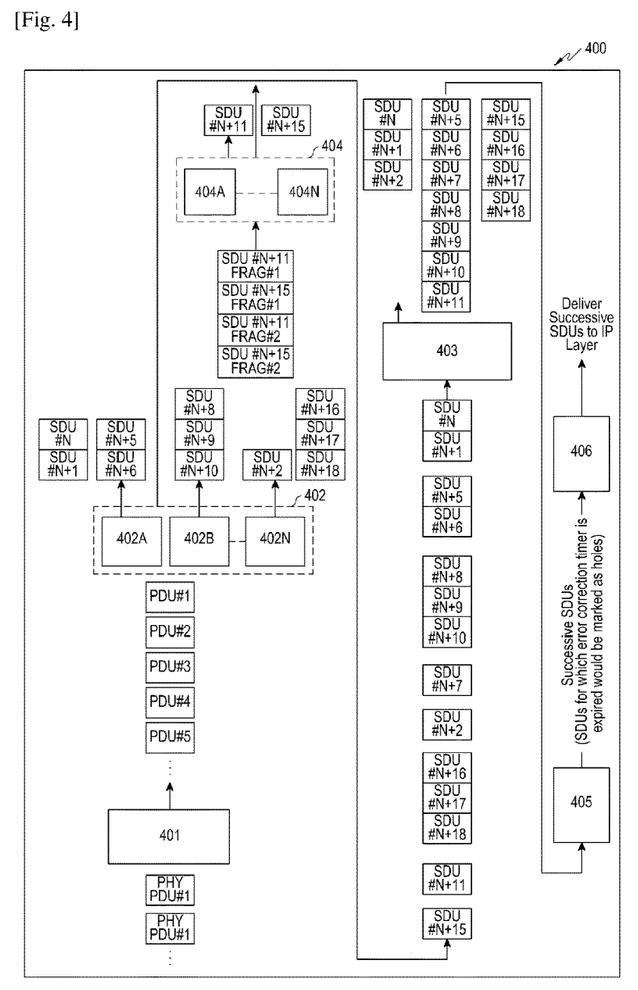
FIG. 4 illustrates a block diagram of a multi-core system for parallel processing of data, according to an embodiment of the present invention.

FIG. 4 illustrates a block diagram of a multi-core system 400 for parallel processing of data, according to an embodiment of the present invention. The system 400 comprises one or more receiving units 401, one or more processing units 402, a sorting unit 403, one or more fragment processing units 404, a window processing unit 405, and a delivery unit 406. The one or more receiving units 401 receive one or more protocol data units (PDUs). The one or more processing units 402 are connected with the one or more receiving unit 401 for processing the one or more PDUs to extract one or more service data units (SDUs). The sorting unit 403 is connected to the one or more processing units 402 for processing the one or more SDUs to derive one or more lists of sequentially contiguous one or more SDUs. The window processing unit 405 is connected to the sorting unit 403 for processing the one or more derived lists of sequentially contiguous one or more SDUs for sending the in-sequence one or more SDUs to a delivery unit 406. In one embodiment, the MAC PDUs are distributed using a suitable selection such as algorithm, round-robin and load-balancing algorithm.

In one embodiment, the one or more processing units 402 ascertains on processing the one or more PDUs that the extracted output is fragments of one or more service data units (SDUs) then the processing units 402 sends such one or more fragmented service data units (SDUs) to the one or more fragment processing units 404. The fragment processing unit 404 process the connection header of the fragmented service data units to reassemble the two or more fragmented SDUs based on the sequence number of each of the fragmented SDU.

In one embodiment, the receiving unit 401 is a medium access control (MAC) receiving unit. The MAC receiving unit 401 initializes DL RLC (Down link radio link control) when a connection is established for an Radio Network Temporary Identifier (RNTI) and notifies to the other units/threads in the system 400 for performing associated processes. The MAC receiving unit 401 receives one or more MAC PDUs and provides the same to one or more MAC processing units 402. During DL RLC connection termination process (i.e. when a connection is terminated for an RNTI), the MAC receiving unit 401 informs about the termination to other units/threads in the system 400 for performing associated process.

In one embodiment, the processing unit 402 is a MAC processing unit. The MAC processing unit 402 process the connection headers of non-fragmented RLC SDUs in order to reorder the RLC SDUs and construct a list linking the successive RLC SDUs (includes duplicate Packet detection). If a MAC PDU contains non-successive SDUs, the processing unit 402 constructs multiple lists where each list contains successive SDUs and then delivers the lists to the RLC SDU unit.

If MAC PDU contains fragmented RLC SDU, the processing unit 402 sends the same to an appropriate RLC fragment processing unit and ensures that all fragmented SDUs of same RLC SDU go to same fragmented processing unit 403. The processing unit 402 also processes the extended headers (like poll-bit) in MAC PDU.

In one embodiment, the fragment processing unit 404 is a RLC fragment processing unit. The RLC fragment processing unit 404 process the connection header parameters of fragmented RLC SDUs to reassemble the two or more RLC fragmented SDUs. If RLC SDU has any successive RLC SDU, the RLC fragment processing unit 404 prepares a list and links the successive RLC SDU, and then provides reassembled and linked RLC SDU to the sorting unit 403.

In one embodiment, the sorting unit 403 is a RLC SDU sorting unit. The RLC SDU sorting unit 403 buffers the list of successive SDUs for a time T1. At every period of time T1, the RLC SDU sorting unit 403 re-orders the received lists and merges the lists if there are lists with successive RLC SDUs (including duplicate Packet detection). After every period of time T1, the sorting unit 403 delivers the merged lists to the window processing unit 405. In case of detection of missing RLC SDU, the sorting unit 403 initiates error detection timer (to take care of HARQ reordering) for the missed RLC SDUs. The sorting unit 403 optionally handles a process of expiry of error detection timer based on the value of the time T1 and accordingly updates NACK table upon expiry of error detection timer.

In one embodiment, the window processing unit 405 is a RLC window processing unit which inserts the received RLC SDU lists at appropriate place in RLC Window so that SDUs are in ordered as per their sequence numbers (including duplicate Packet detection). The window processing unit 405 handles the packets which are received out-side of RLC window and updates window status variables such as Vr(R), Vr(T) and Vr(H). If a sorting unit 403 is not handling expiry procedure of error detection timer, the RLC window processing unit 405 handles the expiry procedure of error detection timer and updates NACK table upon the expiry of Error Detection Timer. The RLC window processing unit 405 detects missing RLC SDU and start error correction timer for the missed RLC SDUs. The RLC window processing unit 405 manages an expiry procedure for Error Correction Timer and marks RLC SDUs for which Error Correction Timer expires as Holes. Upon reception of successive SDUs or after the expiry of Error Correction Timer, the Window Processing unit 405 delivers the successive SDUs to a delivery unit 406. Upon expiry of Sync loss timer management (i.e. start & expiry procedures), the RLC window processing unit 405 notifies to all relevant threads/units for RLC Reset.

In one embodiment, the delivery unit 406 is a RLC delivery unit which delivers the successive SDUs received from the RLC window processing unit 405 to IP Layer.

In one embodiment, RLC Sequence number is given to RLC SDUs (and not RLC PDUs). However, procedure will be equally applicable even if the RLC Sequence numbers are assigned to RLC PDUs.

The present invention primarily focuses on modularization of RLC and MAC processing when receiving packets with higher data rates. The RLC/MAC layer (as shown in FIG. 3) can be configured to receive data in one of following three modes: Transparent Mode(TM), Unacknowledged Mode (UM), and Acknowledged Mode (AM). The present invention is described below in the context of operation of RLC unit in the AM mode.

In one embodiment, the present invention provides a system 400 and method for achieving very high data rates of about 50 Gbps in a wireless communication system by performing parallel processing of MAC/RLC functionalities. The Main RX Proc or MAC receiving unit 401 receives MAC PDUs from lower layer and distributes the received MAC PDUs among the MAC processing units 402. The MAC processing unit 402 always receives a complete MAC PDU for processing. The MAC PDUs can be provided from the receiving unit 401 to the MAC processing units 402 using a suitable selection algorithm, including round-robin or load-balancing algorithm.

After receiving a MAC PDU, the MAC processing unit 402 performs header parsing and sorts the RLC SDUs present in the MAC PDU and passes the sorted list of RLC SDUs to the RLC SDU sorting unit 403. The number of parallel parsing of MAC PDU headers and parallel sorting of RLC SDUs in the MAC PDU depends on the number of MAC PDU processing units 402 present in the system 400. If the MAC PDU processing unit 402 detects fragmented RLC SDUs, it passes the fragmented RLC SDUs to the RLC fragment processing unit 404. The RLC fragment processing unit 404 assembles all the fragments of a RLC SDU and delivers the complete RLC SDU to the RLC SDU sorting unit 403. The parallel reassembly of RLC SDU fragments is possible only when the number of parallel reassembly of RLC SDU fragments depends on the number of RLC fragment processing units 404 present in the system 400. However, the MAC PDU processing unit 402 must ensures that all the fragments of a RLC SDU are delivered to the same RLC fragment processing unit 404.

In one of the embodiment, two RLC fragment processing units present in the system 400, wherein a RLC fragment processing unit 1 receives RLC SDU fragments of RLC SDUs with odd sequence number and a RLC fragment processing unit 2 receives RLC SDU fragments of RLC SDUs with even sequence number. The RLC SDU sorting unit 403 receives the sorted list of RLC SDUs from multiple MAC processing units 402 and RLC fragment processing unit 404, and merges RLC SDUs in to the existing sorted RLC SDU list and deliver multiple contiguous RLC SDU lists to the RLC window processing unit 405.

In one of the embodiment, when the RLC SDU sorting unit 403 detects missing RLC SDU in the sorted RLC SDU list, it triggers error detection timer for the missing RLC SDU. If RLC SDU sorting unit 403 does not receive the missing RLC SDU within a threshold time, it triggers error correction timer for the same missing RLC SDU and informs the RLC window processing unit 405 about the missing RLC SDU. When the RLC SDU sorting unit 403 manages error detection and error correction timer, the system 400 is constrained to have only one RLC SDU sorting unit 403 and parallelization of RLC SDU sorting is difficult.

In another embodiment, two or more RLC SDU sorting unit 403 receive sorted list of RLC SDUs from the multiple MAC processing units 402 and the RLC fragment processing units 404 and merges RLC SDUs in to their respective sorted RLC SDU list and deliver multiple contiguous RLC SDU lists to the RLC window processing unit 405. The RLC window processing unit 405 receives multiple sorted RLC SDU lists and triggers error detection timer for missing RLC SDU. If the RLC window processing unit 405 does not receive the missing RLC SDU in a threshold time, it triggers error correction timer for the missing RLC SDU.

In the present invention, only one RLC window processing unit 405 is present in the system 400 and is responsible for RLC receiver window management, processing of poll-bit and generating the status message for transmission. The RLC window processing unit 405 is also responsible for delivery of the in-sequence RLC SDUs to the RLC delivery unit 406. The RLC delivery unit 406 delivers the RLC SDUs received from the RLC window processing unit 405 to next higher layer.

The system 400 of the present invention is adapted for the combination of different processing units/entities, which results into lesser number of the processing units as per the system/resource constraints and the processing needs/data rate requirements.

For example: Some of the Possible Combinations are Provided below:

RLC Rx parallelization can be achieved with two processing units: Processing unit A performs the tasks done by MAC receiving unit, MAC processing unit and RLC fragment processing unit, and Processing unit B performs the tasks done by RLC SDU sorting unit, RLC window processing unit and RLC delivery unit.

RLC Rx parallelization can be achieved with three processing units for example: Processing unit A performs the tasks done by MAC receiving unit and MAC processing unit, Processing unit B performs RLC fragment processing unit and Processing unit C performs the tasks done by RLC SDU sorting unit, RLC window processing unit and RLC delivery unit.

RLC Rx parallelization can be achieved with three processing units for example: Processing unit A performs the tasks done by MAC receiving unit and MAC processing unit, Processing unit B performs RLC fragment processing unit and RLC SDU Sorting unit, and Processing unit C performs the tasks done by RLC window processing unit and RLC delivery unit.

RLC Rx parallelization can be achieved with four processing entities for example: Processing unit A performs the tasks done by MAC receiving unit and MAC processing unit, Processing unit B performs RLC fragment processing unit, Processing unit C performs the tasks done by RLC SDU sorting unit and Processing unit D performs the tasks done by RLC window processing unit and RLC delivery unit.

However, note that there are other possible combinations which can be seen as obvious extensions to this invention.

In one embodiment, each of the units runs as independent unit of execution.

In another embodiment, each of the unit of execution can run on different processing cores, or they can share the processing cores.

In yet another embodiment the unit of execution shares the processing cores, the sharing policy can be based on the processing load balancing. In further embodiment, the units of executions share the processing cores, follows the same processing steps as mentioned above.

As explained above, each processing entity works as a chain of processing and after completing the defined activity the output of the activity is passed to the next processing unit in the chain. The next processing entity can be selected at runtime as well, for example if MAC unit detects the fragment then after working on the MAC PDU, the output of the activity is passed to the fragment processing unit and if no fragment is detected the reference of the processed object is passed to the sorting unit.

In one embodiment, when PDCP design require some security functions to be executed by the RLC/MAC, a separate unit can be introduced in the proposed chain mechanism or even the functionality of the existing units can be extended.

Figure 5:
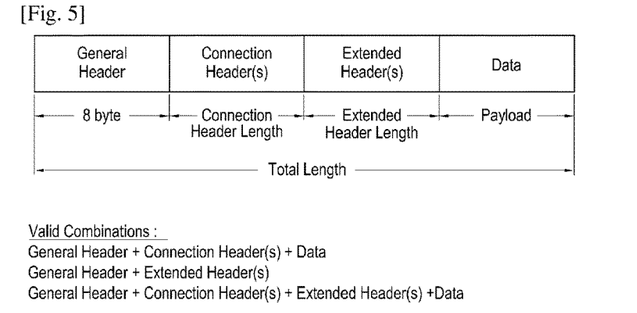
FIG. 5 illustrates a MAC PDU format, according to an exemplary embodiment of the present invention.

FIG. 5 illustrates a MAC PDU format according to an exemplary embodiment. The MAC PDU format contains General Header, Connection Header(s), Extended Header(s) and Data (Payload).

MAC PDU contains only one General Header and may contain multiple Connection Headers and multiple Extended Headers. Number of Connection Headers in the MAC PDU depends on the number of RLC SDUs plus number of RLC SDU fragments present in the MAC PDU.

The Extended Header deals with status information of RLC packets, for example be ACK/NACK messages for UL RLC SDUs or the polling message for DL RL SDUs. Number of Extended Headers in the MAC PDU depends on the number of UL RLC SDUs for which status need to be generated.

Figure 6:
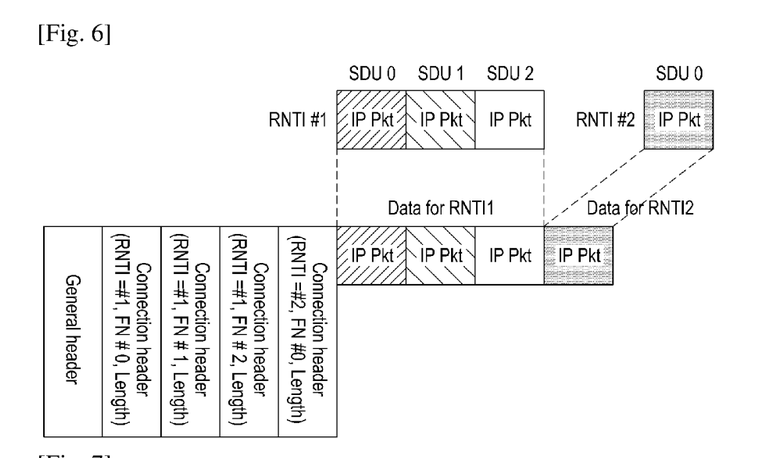
FIG. 6 illustrates a MAC PDU format with Multiple IP Packets, according to an exemplary embodiment of the present invention.

FIG. 6 illustrates MAC PDU format with Multiple RLC SDUs/IP Packets, according to an exemplary embodiment of the present invention. The RNTI field present in the Connection Header of RLC SDU/IP packet is used to identify the RLC SDU/IP Packet belongs to which flow of the RLC SDU/IP packet. In one of the exemplary embodiment, RLC MAC processing unit performs connection header parsing and delivers RLC SDUs only to the RLC SDU sorting unit of corresponding flow.

Figure 7:
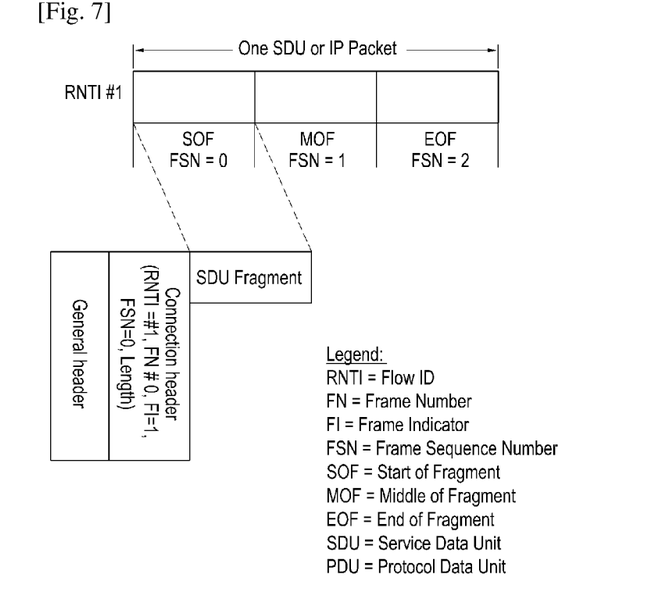
FIG. 7 illustrates MAC PDU carrying a fragmented RLC SDU, according to an exemplary embodiment of the present invention.

FIG. 7 illustrates MAC PDU format carrying a fragmented RLC SDU according to an exemplary embodiment of the present invention. The Fragment Information (FI) field and SDU sequence number (SN) field in the Connection Header is used to detect the fragmented RLC SDU of a particular sequence number. In one of the embodiment, RLC MAC processing unit performs connection header parsing and delivers fragmented RLC SDU only to the RLC fragment processing unit of corresponding flow.

Figure 8:
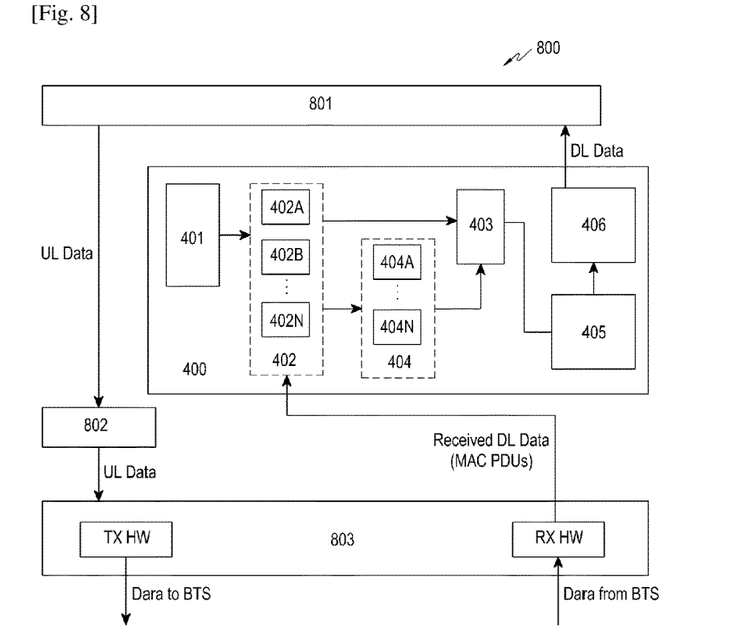
FIG. 8 illustrates a wireless system architecture depicting a Process/Thread Structure showing important blocks in Rx Processing chain, according to an embodiment of the present invention.

FIG. 8 illustratesan wireless system architecture 800 depicting a Process/Thread Structure showing important blocks in Rx Processing chain, according to an embodiment of the present invention. The wireless system architecture 800 comprises a multi-core system 400, IP layer 801, a transmitter functional module 802, a transceive unit 803.

Figure 9:
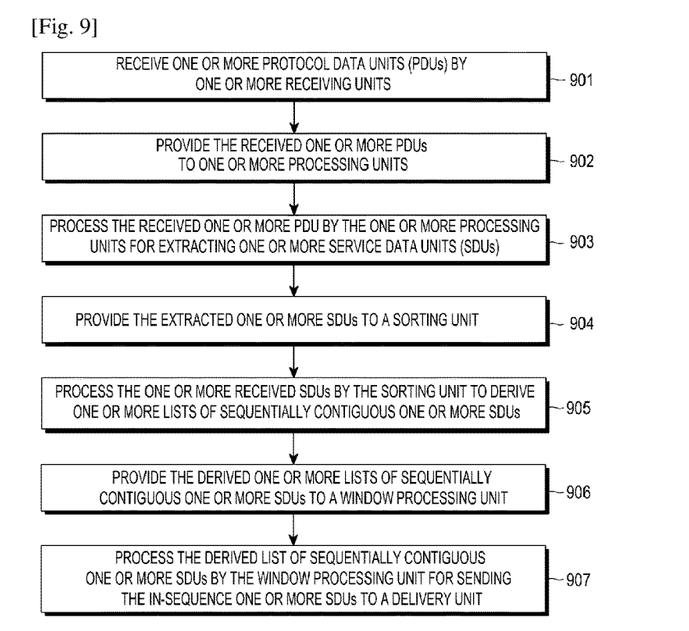
FIG. 9 illustrates a flow chart of a method of parallel processing of data on a multi-core system, according to an embodiment of the present invention.

FIG. 9 illustrates a flow chart of a method of parallel processing of data on a multi-core system 400, according to an embodiment of the present invention. At step 901, one or more protocol data units (PDUs) are received by one or more receiving units. At step 902, the received one or more PDUs are provided to one or more processing units. At step 903, the received one or more PDU are processed by the one or more processing units for extracting one or more service data units (SDUs). At step 904, the extracted one or more SDUs are provided to a sorting unit. At step 905, the one or more received SDUs are processed by the sorting unit to derive one or more lists of sequentially contiguous one or more SDUs. At step 906, the derived one or more lists of sequentially contiguous one or more SDUs are provided to a window processing unit. At step 907, the derived list of sequentially contiguous one or more SDUs are processed by the window processing unit for sending the in-sequence one or more SDUs to a delivery unit.

The system and method disclosed in the present invention have several advantages. The MAC processing unit 402 can be instantiated as many times as needed depending on the load of the MAC PDU processing unit 402 and the number of MAC PDUs is coming in a unit of time. This in turn enables to scale the system for higher data rates. Each MAC processing unit 402 can process one MAC PDU at a time. Similarly, the RLC fragment processing unit 404 can process one RLC SDU fragment at a time. Since multiple instances are possible for the MAC processing unit 402 and the RLC fragment processing unit 404, the processing load in the processing chain should be moved to these two processing units as much as possible without introducing too much shared data/state dependency between processing units.

Since re-ordering & insertion of RLC SDUs in the RLC Window unit 405 could introduce significant processing time & complexity, the re-ordering of RLC SDUs is introduced in the early processing units also. This helps the later processing units, such as the RLC SDU sorting unit 403 and the RLC window processing unit 405 to work with less number of units and hence speeding up the reordering & insertion process.

The RLC SDU sorting unit 403 is provided to reduce the load of ordering & insertion of RLC SDUs in RLC Window. For example, number of lists containing sequential RLC SDUs being processed at the RLC SDU sorting unit 403 is about 8 and the same is reduced to three after the performing the Sorting process. This makes the RLC window processing unit 405 to only have to operate on three lists, instead of eight. This helps to reduce the insertion load at the RLC window processing unit 405 and helps the RLC window processing unit 405 to do other tasks such as Window Status variable update, timer expiry handling routines, etc efficiently. Additionally, the RLC SDU sorting unit 403, RLC window processing unit 405 and RLC delivery unit 406 can be instantiated for each RNTI/Flow which helps further parallelize the MAC & RLC Rx operations when more than one RNTI are in operation.

Therefore, there is a need for method and system for parallel processing of data to obtain high data rate in order of 50 Giga bits in a wireless communication system.

Aspects of the present disclosure are to address at least the above-mentioned problems and/or disadvantages and to provide at least the advantages described below. Accordingly, an aspect of the present disclosure is to provide a system and method for parallel processing of data in order to obtain high data rates in a wireless communication system.

Although the invention of the method and system has been described in connection with the embodiments of the present invention illustrated in the accompanying drawings, it is not limited thereto. It will be apparent to those skilled in the art that various substitutions, modifications and changes may be made thereto without departing from the scope and spirit of the invention.

What is claimed is:

1. A method of parallel processing of data on a multi-core system, comprising:
   receiving a plurality of protocol data units (PDUs) by a plurality of processors;
   classifying the received PDUs into a plurality of data groups each including at least one PDU;
   processing the PDUs in the plurality of data groups in parallel by the plurality of processors to extract service data units (SDUs), wherein the plurality of data groups is processed by the plurality of processors respectively and the plurality of processors are configured to operate in parallel;
   sorting the extracted SDUs by the plurality of processors to derive lists of sequentially contiguous SDUs; and
   window-processing the derived lists of sequentially contiguous SDUs by the plurality of processors to output in-sequence SDUs.

2. The method as claimed in claim 1, further comprising:
   selecting a fragment processor for providing of one or more fragmented SDUs based on a sequence number of each of the fragmented SDU.

3. The method as claimed in claim 1, further comprising:
   detecting one or more fragmented SDUs by the plurality of processors;
   providing the one or more fragmented SDUs to one or more fragment plurality of processors;
   processing the one or more fragmented SDUs by the one or more fragment plurality of processors; and
   providing the reassembled one or more SDUs to the plurality of processors.

4. The method as claimed in claim 3, wherein processing the one or more fragmented SDUs comprises processing a connection header to reassemble two or more fragmented SDUs based on a sequence number of each of the fragmented SDU.

5. The method as claimed in claim 1, wherein the PDUs are medium access control (MAC) PDUs, and the SDUs are radio link control (RLC) SDUs.

6. The method as claimed in claim 1, wherein the processing of the PDUs in the plurality of data groups in parallel by the plurality of processors comprises:
   processing a connection header, and an extended header of each of the PDUs;
   arranging one or more SDUs in a prescribed order;
   removing one or more duplicate SDUs; and
   deriving one or more lists of sequentially contiguous SDUs.

7. The method as claimed in claim 1, wherein the sorting of the extracted SDUs by the plurality of processors comprises generating the lists of contiguous SDUs, detecting of one or more missed SDUs and initiating error detection timer.

8. The method as claimed in claim 1, wherein the plurality of processors is scheduled to run only after an expiration of pre-defined time.

9. The method as claimed in claim 1, wherein the sorting of the extracted SDUs by the plurality of processors comprises generating a single ordered list of one or more SDUs, updating window status variables, detecting one or more duplicate packets and discarding out-of-window received packets.

10. The method as claimed in claim 1, wherein window-processing the derived lists of sequentially contiguous SDUs by the plurality of processors comprises handling of error detection timer.

11. The method as claimed in claim 1, wherein window-processing the derived lists of sequentially contiguous SDUs by the plurality of processors comprises of starting of error correction timer for the missed one or more SDUs and removing error correction timer when missed SDU is received.

12. The method as claimed in claim 1, wherein window-processing the derived lists of sequentially contiguous SDUs by the plurality of processors comprises of starting and removing sync loss timer.

13. A multi-core system for parallel processing of data, comprising:
    memory storing computer-executable program instructions;
    a plurality of processors configured to execute the program instructions such that the plurality of processors are configured to:
       receive a plurality of protocol data units (PDUs);
       classify the received PDUs into a plurality of data groups each including at least one PDU;
       process the PDUs in the plurality of data groups in parallel to extract service data units (SDUs), wherein the plurality of data groups is processed by the processors respectively and the processors are configured to operate in parallel;
       sort the extracted SDUs to derive lists of sequentially contiguous SDUs; and
       window-process the derived lists of sequentially contiguous SDUs to output in-sequence SDUs.

14. The system as claimed in claim 13 further comprising: one or more fragment processors for processing a one or more fragmented SDUs to provide a reassembled one or more SDUs to the plurality of processors.

15. The system as claimed in claim 13, wherein the plurality of processors are configured to select a fragment processor for providing of one or more fragmented SDUs based on a sequence number of each of the fragmented SDU.

16. The system as claimed in claim 13, wherein the plurality of processors process the PDUs in the plurality of data groups in parallel to extract the SDUs:
    processing a connection header, and an extended header of each of the PDUs;
    arranging one or more SDUs in a prescribed order;
    removing one or more duplicate SDUs; and
    deriving one or more lists of sequentially contiguous one or more SDUs.

17. The system as claimed in claim 13, wherein the plurality of processors processes the extracted SDUs by generating the lists of contiguous SDUs, detecting of one or more missed SDUs, and initiating error detection timer.

18. The system as claimed in claim 13, wherein the plurality of processors sort the extracted SDUs by generating a single ordered list of one or more SDUs, updating window status variables, detecting one or more duplicate packets, and discarding out-of-window received packets.

* * * * *